United States Patent
Lais et al.

(10) Patent No.: US 7,669,010 B2
(45) Date of Patent: **\*Feb. 23, 2010**

(54) PREFETCH MISS INDICATOR FOR CACHE COHERENCE DIRECTORY MISSES ON EXTERNAL CACHES

(75) Inventors: Eric N. Lais, Tillson, NY (US); Donald R. DeSota, Portland, OR (US); Rob Joersz, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 109 days.

This patent is subject to a terminal disclaimer.

(21) Appl. No.: 12/105,405

(22) Filed: Apr. 18, 2008

(65) Prior Publication Data

US 2008/0195820 A1 Aug. 14, 2008

Related U.S. Application Data

(63) Continuation of application No. 10/983,350, filed on Nov. 8, 2004, now Pat. No. 7,395,375.

(51) Int. Cl.
*G06F 12/00* (2006.01)

(52) U.S. Cl. ........................ 711/141; 365/233; 370/389; 709/313; 711/137; 711/146; 714/5; 718/103

(58) Field of Classification Search ................. 365/233; 370/389; 709/313; 711/137, 141, 146; 714/5; 718/103
See application file for complete search history.

(56) References Cited

U.S. PATENT DOCUMENTS

| | | | |
|---|---|---|---|
| 5,715,425 A | 2/1998 | Goldman et al. | |
| 5,835,947 A | 11/1998 | Cherabuddi | |
| 5,854,911 A | 12/1998 | Watkins | |
| 5,864,671 A | 1/1999 | Hagersten et al. | |
| 6,012,134 A | 1/2000 | McInerney et al. | |
| 6,243,794 B1 | 6/2001 | Casamatta | |
| 6,272,622 B1 | 8/2001 | Han et al. | |
| 6,321,301 B1 | 11/2001 | Lin et al. | |
| 7,038,972 B2 | 5/2006 | Seo et al. | |
| 2002/0002659 A1 | 1/2002 | Michael et al. | |

(Continued)

OTHER PUBLICATIONS

A. Billingsly et al., "Memory Latency Reduction Using An Address Prediction Buffer," IEEE Computer Society Press (1992), pp. 78-82.

(Continued)

*Primary Examiner*—Tuan V Thai
*Assistant Examiner*—Yong Choe
(74) *Attorney, Agent, or Firm*—Walter W. Duft

(57) ABSTRACT

A system, method and article of manufacture for reducing latencies associated with cache coherence directory misses on external caches in a shared distributed memory data processing system. A cache coherence directory is evaluated for possible prefetching of a directory entry into a directory cache. A prefetch miss indicator is set if the prefetch evaluated results in a directory miss. The prefetch miss indicator is consulted during subsequent processing of a memory block request corresponding to the directory entry. An accelerated snoop response action is taken if the prefetch miss indicator is set. The latency of a second lookup into the cache coherence directory, which would otherwise be required, is thereby avoided.

21 Claims, 7 Drawing Sheets

U.S. PATENT DOCUMENTS

| | | |
|---|---|---|
| 2003/0252076 | 8/2003 | Lee et al. |
| 2003/0191866 A1 | 10/2003 | Wolrich et al. |
| 2004/0049640 A1 | 3/2004 | So et al. |
| 2004/0148473 A1 | 7/2004 | Hughes et al. |
| 2005/0210199 A1 | 9/2005 | Dimpsey et al. |
| 2005/0289551 A1 | 12/2005 | Wojtkiewicz et al. |
| 2006/0010339 A1 | 1/2006 | Klein |

OTHER PUBLICATIONS

J. D. Collins et al., "Runtime Identification Of Cache Conflit Misses: The Adaptive Miss Buffer," ACM Transactions on Computer Systems, vol. 19, No. 4 (Nov. 2001), pp. 413-439.

Wei Fen Lin et al., "Designing A Modern Memory Hierarchy With Hardware Prefetching," IEEE Transactions on Computers, vol. 50, No. 11 (Nov. 2001), pp. 1202-1218.

PREFETCH MISS INDICATOR FOR CACHE COHERENCE DIRECTORY MISSES ON EXTERNAL CACHES

This application is a continuation under 35 U.S.C. 120 application Ser. No. 10/983,350, filed Nov. 8, 2004, now U.S. Pat. No. 7,395,375 entitled "Prefetch Miss Indicator For Cache Coherence Directory Misses On External Caches."

BACKGROUND OF THE INVENTION

1. Field of the Invention

This invention relates to the management of cache memory in data processing systems employing directory-based cache coherence techniques. More particularly, the invention is directed to the reduction of memory access latency associated with cache coherence directory misses on external caches.

2. Description of the Prior Art

By way of background, modern computer systems utilize high-speed cache memory coupled with an associated cache controller (collectively referred to as a "cache") as a bridge between processors and the relatively slow main memory that holds processor data. As shown in FIG. 1, a cache typically resides in close proximity to the processor it serves, with one or more cache levels often being situated on the processor die itself. The function of a cache is to temporarily store selected subsets of main memory, particularly memory blocks that are frequently accessed. The cached information is thus available to quickly satisfy memory accesses without the latency associated with access requests to main memory.

In multiprocessor systems, such as that shown in FIG. 2, each processor typically has its own cache, and each cache may independently store a copy of the same memory block from a main memory shared by all processors via a common system bus. This situation requires that a cache coherence scheme be used in order to ensure that data consistency is maintained between the several processors. As is well known in the art, a "bus-snooping" protocol is commonly used for this purpose. Bus snooping is premised on the idea that the bus is the broadcast medium for all processor-initiated read and write requests to memory. Each processor's cache is a bus agent that can thus listen or "snoop" on the bus in order to apprise itself of bus-related actions taken by other caches with respect to shared memory blocks. When a processor wants to update a memory block and a memory request to write the block is placed on the bus by its cache, all other caches holding the same memory block will know to invalidate their copy. The cache associated with the block-writing processor will now have the only valid copy of the memory block in the system (until the block is written to main memory). When a processor requests a memory block and its cache places a read request on the bus, another cache holding a valid copy of the requested block can respond. If the main memory has the only valid copy, the request will be satisfied from this memory. If a processor cache has the only valid copy, the request must be satisfied by that cache.

In larger-scale multiprocessor systems, such as that shown in FIG. 3, the main memory of the system is often distributed among plural processing nodes that are interconnected by a network. Each node typically comprises a small-scale multi-processor system as described above relative to FIG. 2 (i.e., several processors accessing a main memory over a shared bus). The local memory of each node provides a portion of the overall system memory. A processor at any given node can access its own local memory as well as the memories of other nodes. For a given node, the memory at any other node in the system is typically referred to as remote memory or external memory.

A distributed directory-based cache coherence scheme is commonly used to maintain coherence between the caches of different nodes, all of which could theoretically hold a copy of the same memory block. Each node maintains a cache coherence directory to keep track of which processors in the system have cached memory blocks from that node's local memory. Each directory entry typically contains a tag corresponding to the address of a given memory block, identifying information for locating all processors that are caching the block, and a status field indicating whether the cached copies are valid. A node's directory information is used to evaluate read and write requests pertaining to the node's memory blocks and to send out coherency messages to all caches that maintain copies. When a processor in the system updates a shared memory block, the directory having jurisdiction over the memory block is consulted to determine which caches hold copies of the block. Before the write operation can proceed, invalidation messages are sent to the identified caches and invalidation acknowledgements must be returned to verify that all cached copies have been invalidated. In similar fashion, when a processor requests read access to a shared memory block, the directory having jurisdiction over the block is consulted to identify the location and status of all cached copies. Based on the information in the directory, the requested block can be provided to the requester from one of the caches holding a valid copy, or from the main memory of the node that stores the block.

Within each node, the job of managing the cache coherence directory and coordinating the exchange of coherency messages is performed by an intelligent processing agent known as a "coherence controller." As shown in FIG. 3, each coherence controller is connected so that it can communicate concurrency messages with its peers on other nodes by way of the system interconnection network. Each coherence controller also sits as a snooping agent on the local memory bus of it host node. The coherence controllers can thus keep track of all external and local caching of memory blocks under their jurisdiction.

Because cache coherence directories are sometimes large, and are usually stored in relatively low-speed memory, it is common for coherence controllers to implement a high-speed directory cache in order to temporarily store subsets of relevant directory entries. This can greatly reduce the latency associated with directory lookups. In order to populate the directory cache, a coherence controller will perform prefetches (speculative lookups) of directory entries prior to receiving actual lookup requests for particular memory blocks. Conventional algorithms based on principles of spatial locality can be used to select optimal prefetch candidates. For example, following a directory lookup of a particular memory block requested by some processor as part of a read or write operation, the caching algorithm may attempt to prefetch into the directory cache some number of additional directory entries corresponding to memory blocks whose addresses are proximate to that of the requested block.

One issue that arises when using a directory prefetching scheme is that a prefetch operation may result in a directory "miss" on the candidate directory entry. A directory miss signifies that a memory block associated with the prefetch attempt is not cached anywhere in the system outside of the local node, i.e., there is no copy present in any external cache. In that case, there will be either no directory entry for the memory block, or a directory entry will exist but will be marked invalid. Such a directory entry will not be placed in the directory cache insofar as the caching algorithm is designed to discard invalid entries to make room for a new cache entries and adding an invalid entry could potentially replace a valid entry, thus consuming time and system resources to replace that entry.

Subsequently, when the memory block associated with the prefetch miss is actually requested for reading or writing by a local processor, the cache coherence directory will again be accessed and a directory miss will again occur. Note that because the requester is a local processor, the second directory lookup is entirely unwarranted. The fact that there is a directory miss condition signifies there are no external cached copies of the memory block and that a local copy of the memory block can be used without having to notify other nodes. Insofar as the coherence controller is a local bus snooping agent whose snoop response must be awaited before a memory block request from a local requester can be satisfied, the local node experiences undue processing delay. Had it been known that the directory lookup would miss, the requesting processor could have obtained the memory block locally many cycles earlier, without waiting on the coherence controller.

It would be desirable to provide a solution to the foregoing problem whereby such latency can be avoided, particularly since local memory requests tend to predominate at any given node whereas requests to remote or external memories on other nodes are more infrequent.

SUMMARY OF THE INVENTION

The present invention provides a system, method and article of manufacture for reducing the latency that occurs following a cache coherence directory prefetch miss on the external caches of a shared distributed memory data processing system. In exemplary embodiments of the invention, a cache coherence directory is evaluated for possible prefetching of a directory entry into a directory cache. A prefetch miss indicator is set if the prefetch evaluation results in a directory miss. The prefetch miss indicator is consulted during subsequent processing of a memory block request corresponding to the directory entry that missed during the prefetch evaluation. An accelerated snoop response action is taken if the prefetch miss indicator is set. In this way, the latency of a second lookup into the cache coherence directory, which would otherwise be required, is avoided.

The prefetch miss indicator can be implemented in several ways, including by establishing a prefetch miss buffer for storage of the tag associated with the directory prefetch miss. Another option is to establish a new status flag for directory cache entries that signifies the occurrence of a directory prefetch miss on the associated tag.

BRIEF DESCRIPTION OF THE DRAWINGS

The foregoing and other features and advantages of the invention will be apparent from the following more particular description of preferred embodiments of the invention, as illustrated in the accompanying Drawings, in which.

DETAILED DESCRIPTION OF THE PREFERRED EMBODIMENTS

Figure 4:
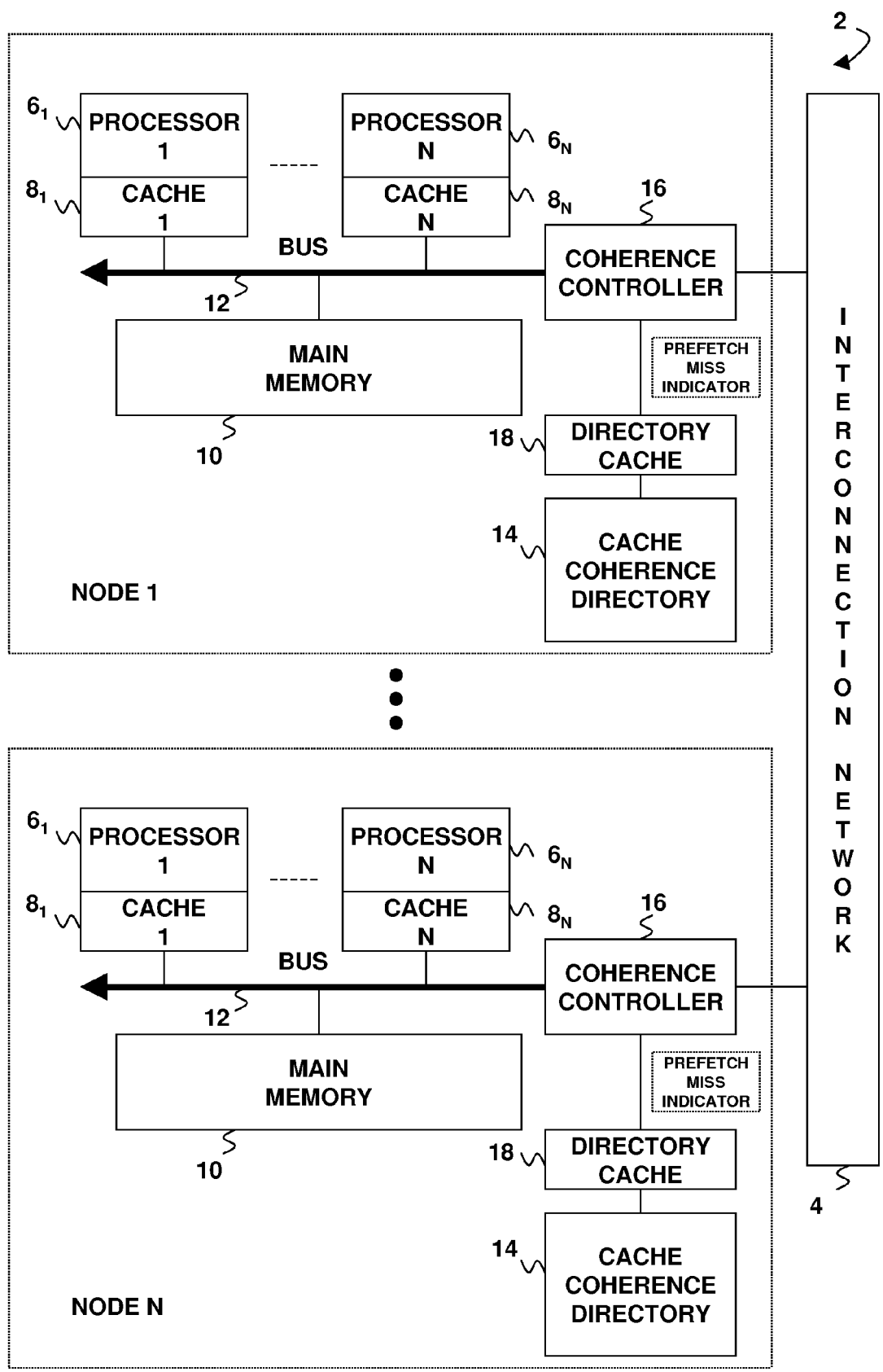
FIG. 4 is a functional block diagram showing a data processing system representing an improvement to the data processing system of FIG. 3 according to the principles of the present invention.

Turning now to the Drawings, in which like reference numerals indicate like elements in all of the several views, FIG. 4 illustrates a data processing system 2 that provides an exemplary environment in which the present invention may be implemented. The data processing system 2 is configured as a network of data processing nodes sharing a distributed memory space. A cc-NUMA architecture, which stands for "cache coherent-Non Uniform Memory Access," is one species of shared distributed memory system that could be used as a model for the data processing system 2. Other types of shared distributed memory architectures could potentially also be used.

Figure 1:
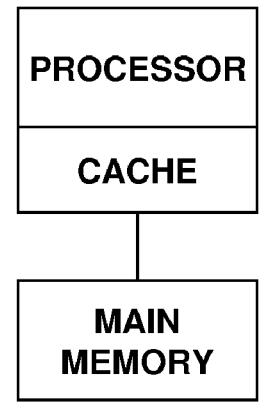
FIG. 1 is a functional block diagram showing a prior art data processing system containing a single processor, a cache and a main memory.
Figure 2:
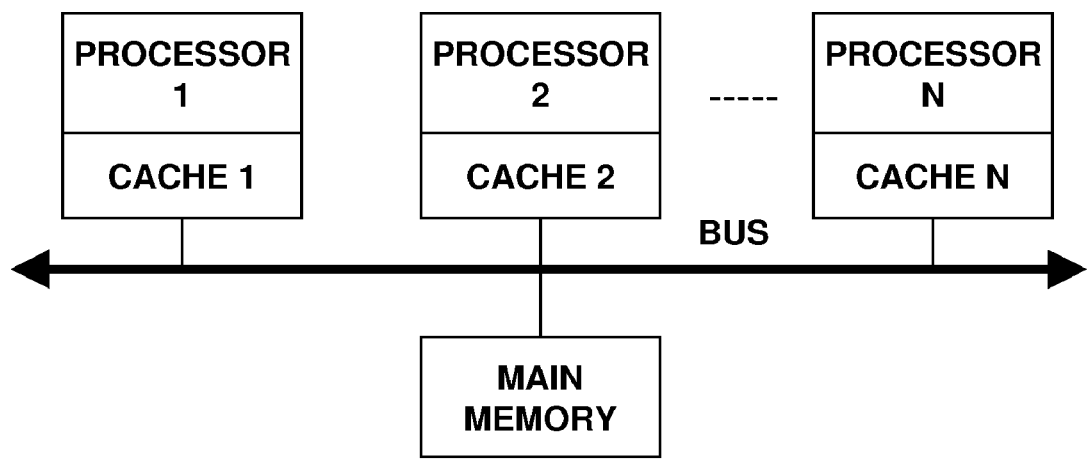
FIG. 2 is a functional block diagram showing another prior art data processing system containing a multiple processors, multiple associated caches, a shared main memory and a common system bus, and employing a bus-snooping cache coherence protocol.
Figure 3:
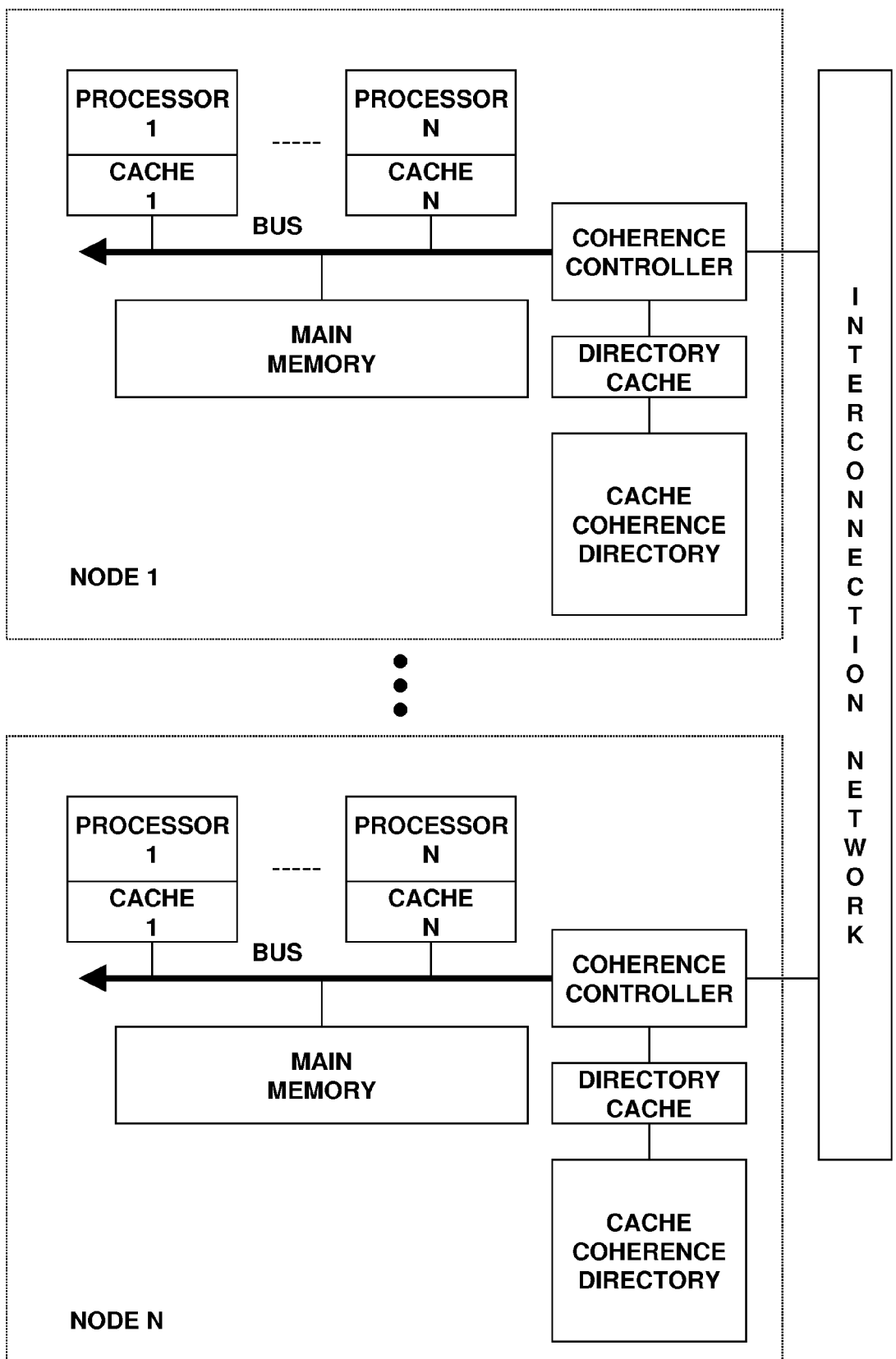
FIG. 3 is a functional block diagram showing another prior art data processing system containing a network of processing nodes accessing a shared memory space, each node containing a data processing system according to FIG. 2 together with functionality for implementing a directory-based cache coherence protocol.

The data processing system 2 comprises "N" processing nodes where N can be any desired number according to processing requirements, cost and other factors. For clarity, FIG. 2 only shows the $1^{st}$ and the $N^{th}$ nodes, which are designated as "Node 1" and "Node N," respectively. An interconnection network 4 interconnects Node 1 through Node N to form what is commonly referred to in the art as a "cluster." The interconnection network 4 can be implemented by way of a switching fabric topology, a ring topology, or any other suitable arrangement, including a combination of ring and fabric topologies.

Each node in the data processing system 2 includes 1 through N processors 6, a cache 8 associated with each processor, and a common main memory 10 interconnected by a system memory bus 12. The memory of the data processing system 2 is distributed across the main memory 10 of all of the nodes of the system, such that the main memory of each node provides a portion of the overall system memory. There is a single system-wide address space and each node's main memory 10 is assigned a unique address range within the address space. Because of the interconnectivity between nodes, a processor 6 at any given node can access its own local memory 10 as well as the memories (and caches) of other nodes (the latter being considered remote or external memory relative to the given node). Which node will service a processor memory access will depend on the address of the memory block being requested.

Cache coherence between the processors 6 within a single node of the data processing system 2 is supported in part by a conventional bus-snooping protocol as described by way of background above. Thus, each of the caches 8 within a node will snoop activity on the local bus 12 (i.e., via a conventional cache controller that is not separately shown). The data processing system 2 further employs a directory-based cache coherence protocol to maintain consistency among the caches 8 of different nodes. To that end, and as described by way of background above, each node includes a cache coherence directory 14 that is managed by a coherence controller 16. Each coherence controller 16 snoops its own local bus 12 and also communicates with its peers at other nodes.

The directories 14 can be configured using any of the well known techniques that are conventionally found in directory-based cache coherence architectures. One option is to configure the directories 14 as full mapped directories in which every memory block in the local main memory 10 associated with a given directory is represented by a directory entry that lists all processors caching the block. Sparse directory formats can also be used, in which case only a fraction of the memory blocks in a directory's local main memory 10 will be represented at any given time. Any suitable memory technology may be used to implement the directories 14, with external DRAM modules being the conventional choice for full directories, and embedded DRAM being the technology most commonly used for sparse directories.

Except to the extent they are modified to implement the functions of the invention, the coherence controllers 16 are all conventional in design. As such, they can be implemented according to well known techniques using programmable protocol processors, custom hardware designs implemented with ASICs (Application Specific Integrated Circuits), or by any other suitable means. As described by way of background above, the principal function of the coherence controllers 16 is to maintain coherence for local memory blocks stored in external caches on other nodes. Access requests involving such memory blocks come from the interconnection network side of the coherence controllers 16 as messages from peer coherence controllers. On the local bus side, access requests for local memory blocks arrive as conventional read/write requests on the local bus 12. Another function of the coherence controllers 16 is to forward local requests for external memory blocks (with addresses outside the range of the local main memory) through the interconnection network 4.

The present invention concerns local memory block requests from local processors, and the remainder of the discussion will thus focus on this aspect of coherence controller operation. When a local processor 6 requests access to a local memory block, it asserts the requested address on the bus 12, and the local coherence controller 16 is notified via its conventional bus snooping functionality. At the same time, all local caches 8 will likewise snoop the request insofar as they are also agents on the bus 12. The requesting processor 6 will then wait for some number of cycles to receive snoop responses from the various bus agents. For example, if the requesting processor 6 seeks to read a memory block, the bus agents on the bus 12 will provide snoop responses advising whether or not they have a valid copy of the requested block. In this context, the only difference between the snoop response of the coherence controller 16 and the responses of the other bus agents on the bus 12 is that the coherence controller 16 collectively speaks on behalf of all external caches holding copies of the requested memory block at other nodes. The coherence controller 16 may thus be thought of as a bus snooping proxy for the external caches.

Each coherence controller 16 uses its directory 14 to provide snooping responses to local processors 6. If one or more copies of a local memory block are being cached externally at other nodes, there will be a directory entry in the directory 14 that contains information for identifying the external processors 6 at the other nodes that are caching the block, and a status field indicating whether the external copies are valid. If a sparse directory format is being used, and there are no externally cached copies of a requested local memory block, there will be no directory entry for that block. If a full directory format is being used, there will be a directory entry that is marked invalid, and the processor-identifying information will show no external processors holding the block. This condition is called a directory miss. The coherence controller's snoop response in this situation is to advise the requesting processor 6 that the controller is not caching the requested memory block.

As discussed by way of background above, among the various functions that may be conventionally performed by each coherence controller 16 is the establishment and management of a directory cache, as shown by reference numeral 18 in FIG. 4. Each directory cache 18 is used to hold a subset of directory entries for rapid access by its coherence controller 16 as the latter services memory block access requests. A fast memory technology, such as SRAM (Static Random Access Memory) is conventionally used to implement such caches. As also mentioned by way of background, a coherence controller 16 conventionally implements a prefetching algorithm to preload anticipated directory entries from its directory 14 into its directory cache 18.

Figure 5:
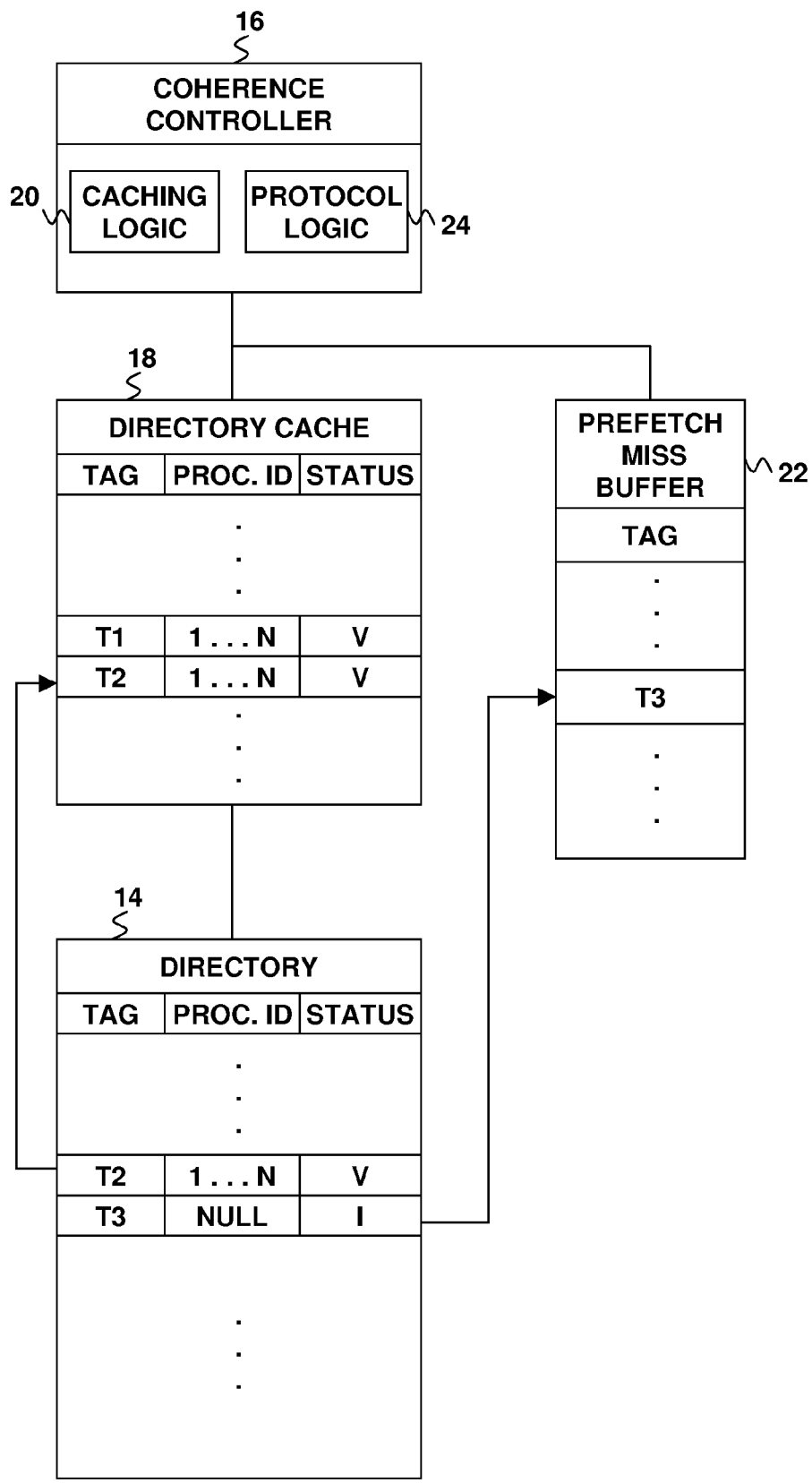
FIG. 5 is a functional block diagram showing a coherence controller, a directory cache, a directory, and a prefetch miss buffer in accordance with one exemplary embodiment of the invention.

FIG. 5 illustrates a typical prefetch operation resulting from a coherence controller 16 evaluating a directory cache entry with tag T1 for some memory block. Caching logic 20 in the coherence controller 16 speculates that additional directory entries having tags T2 and T3 (corresponding to contiguous memory blocks) should be prefetched from the directory 14 into the directory cache 18. The caching logic 20 thus accesses directory entry T2 in the directory 14 and copies it into the directory cache 18. Caching logic 20 then accesses directory entry T3 in the directory 14. In a sparse directory, the caching logic 20 would find that there is no entry for T3. In a full directory, the caching logic 20 will discover that T3's status is invalid and that its processor identification field shows no external processors holding copies of the memory block associated with this entry (referred to as a NULL field in FIG. 5). The T3 directory entry thus represents a directory miss occurring on the directory prefetch attempt.

As discussed by way of background above, a conventional coherence controller encountering the T3 directory entry during a directory prefetch operation would ignore it. In contrast, the present invention recognizes that a prefetch directory miss condition provides useful information that can be used to avoid subsequent processing latency when the same memory block is involved in an actual (non-speculative) request. To that end, the invention proposes the setting of a prefetch miss indicator to represent the fact that a directory miss occurred during the directory prefetch operation. In FIG. 5, the prefetch miss indicator is set as a copy of the T3 tag in a prefetch miss buffer 22 that is implemented using high-speed data storage hardware in the node on which it resides (see below). The T3 tag is placed in the prefetch miss buffer 22 when the caching logic 20 determines that the T3 directory entry has generated a directory miss during the prefetch operation on that tag. The entire T3 directory entry could be alternatively stored as the prefetch miss indicator in the prefetch miss buffer 22. However, no information other than the tag itself should be needed to indicate a prefetch miss.

Subsequently, when a non-speculative request for the T3 memory block is received, the coherence controller's protocol logic 24 performs a lookup in the prefetch miss buffer 22 in addition to its normal lookup in the directory cache 18. Assuming no intervening access to the T3 memory block has occurred on a remote node, the prefetch buffer lookup will result in a match on the T3 tag. This, in turn, terminates further processing on that tag. The coherence controller 16 is able to promptly return a snoop response to the local bus 12 advising that it has no cached copies of the T3 memory block. This snoop response is accelerated when compared to the snoop response that would be generated if a second lookup for the T3 tag had to be performed in the directory 14. By way of example, the latency for a directory lookup in an external DRAM directory would be on the order of 40-60 clock cycles. The latency for a directory lookup in an embedded DRAM directory would be on the order of 8 cycles. By comparison, the prefetch miss buffer 22 can provide single cycle access if it is implemented in SRAM or as a storage register, as discussed below.

If the assumption above does not hold, and there is an intervening access to the T3 memory block between the time of the prefetch operation and the non-speculative lookup, the T3 tag in the prefetch miss buffer 22 will be invalidated by the coherence controller 16. Thereafter, when the non-speculative lookup is made, the T3 tag will not be found in the prefetch miss buffer 22 and conventional tag lookup processing will result.

Figure 6:
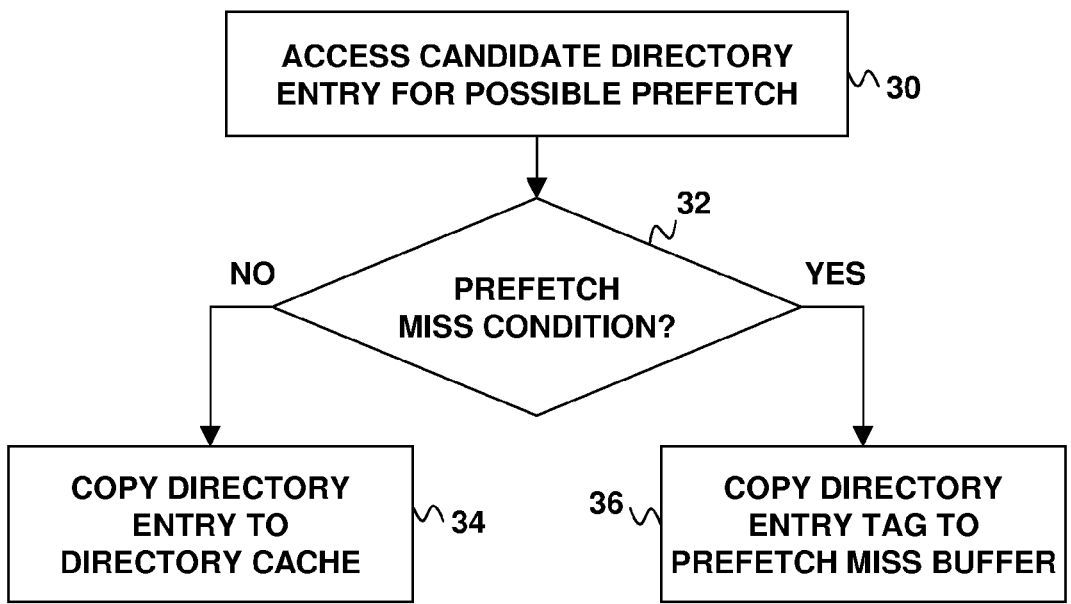
FIG. 6 is a flow diagram showing exemplary prefetch processing that may be performed in accordance with the invention.
Figure 7:
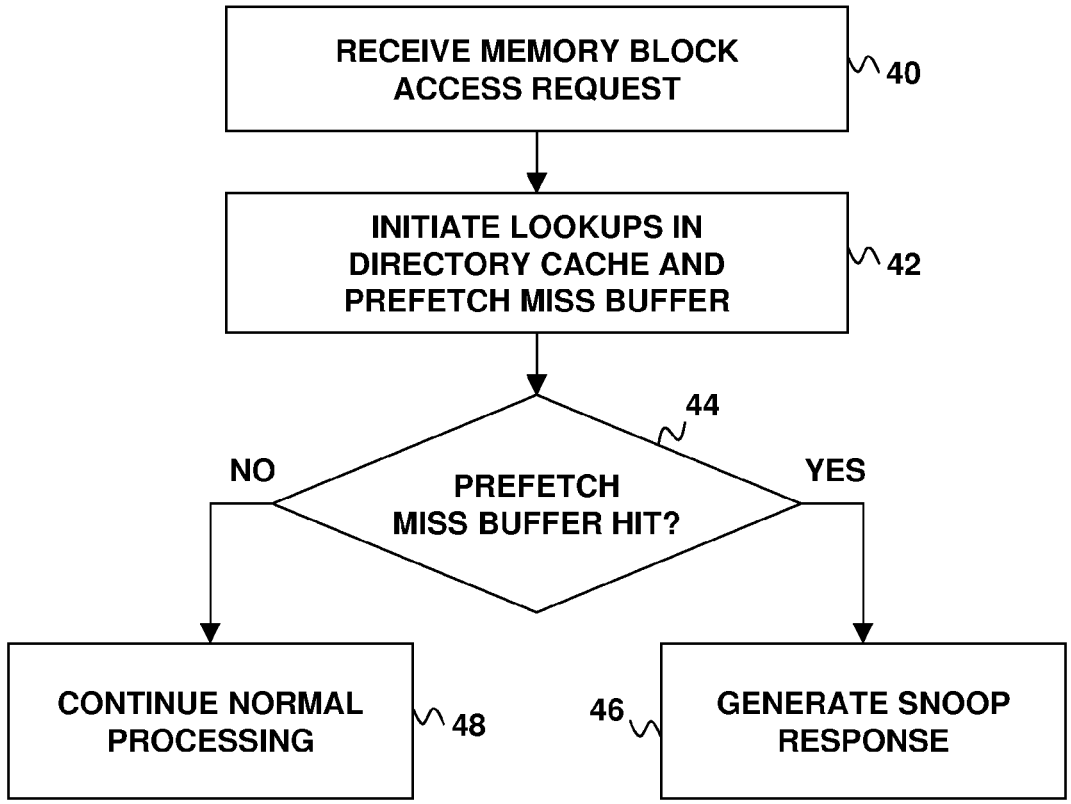
FIG. 7 is a flow diagram showing exemplary protocol logic processing in accordance with the invention.

FIGS. 6 and 7 summarize the exemplary processing logic that may be respectively implemented by caching logic 20 and the protocol logic 24 of the coherence controller 16 to support the aforementioned features of the present invention. Beginning in step 30 of FIG. 6, the caching logic 20 accesses a candidate directory entry in the directory 14 for possible prefetching into the directory cache 18. In step 32, the caching logic 20 tests for a prefetch miss condition. If a miss condition is not present, the caching logic 20 copies the directory entry into the directory cache 18 in step 34. If a miss condition is present, the caching logic 20 sets a prefetch miss indicator, as by copying the directory entry tag into the prefetch miss buffer 22.

In step 40 of FIG. 7, the protocol logic 24 receives a memory block access request. In step 42, it initiates parallel lookups of the directory cache 18 and the prefetch miss buffer 22. If, in step 44, the protocol logic 24 locates a corresponding tag for the memory block in the prefetch miss buffer 22, it generates a snoop response in step 46. Otherwise, in step 48, the protocol logic 24 will either find the corresponding tag in the directory cache 18, or subsequently in the directory 14 if there is no directory cache entry for the tag.

The prefetch miss buffer 22 can be implemented using any suitable data storage hardware that operates at relatively high speed. SRAM is one choice. Another option is to use one or more storage registers associated with the processor or ASIC used for the coherence controller 16. By using fast storage hardware for the prefetch miss buffer 22, the latency associated with a memory block request is accelerated from 40-60 cycles for a lookup in a full external DRAM directory, and from 8 cycles for a lookup in a sparse embedded DRAM directory, to the single cycle access latency that is characteristic of SRAM modules and storage registers. As mentioned above, without the use of a prefetch miss indicator in accordance with the invention, such a lookup into the directory 14 would be performed for any directory entry even though that entry previously generated a prefetch miss.

Figure 8:
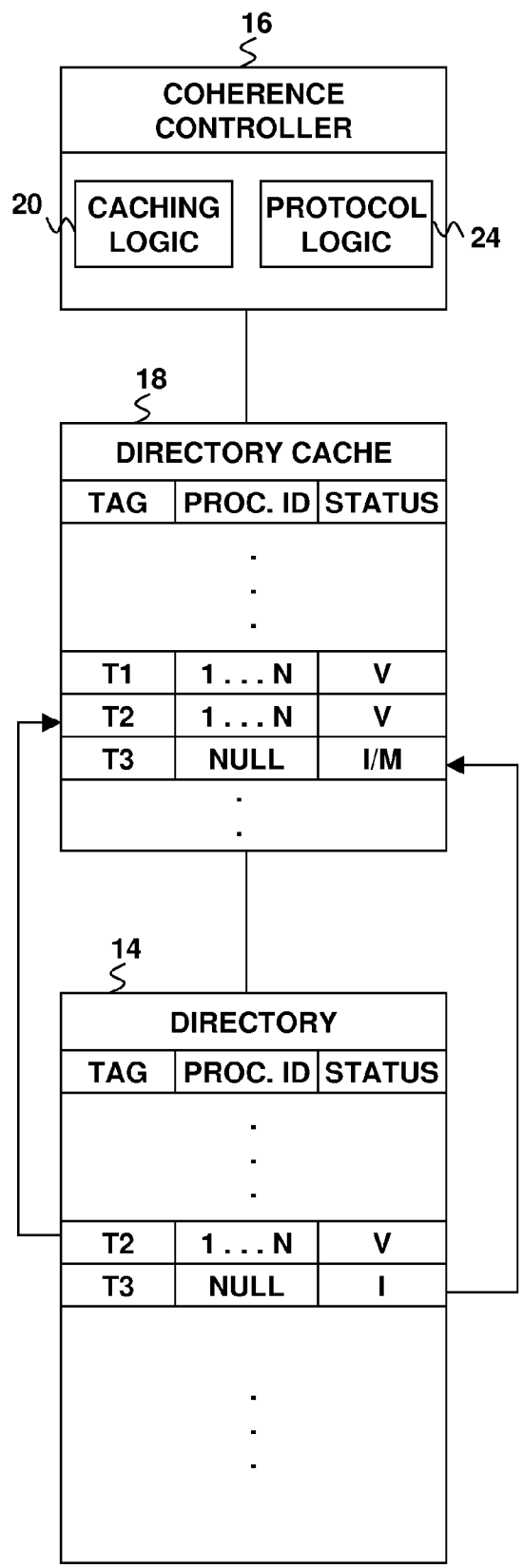
FIG. 8 is a functional block diagram showing a coherence controller, a directory cache, and a directory in accordance with another exemplary embodiment of the invention.

It should be understood that the prefetch miss buffer 22 is not the only way a prefetch miss indicator can be set for consideration during a subsequent non-speculative memory block request. As shown in FIG. 8, one possible alternative technique would be to implement a prefetch miss indicator by adding a new status flag field to directory cache entries. This flag is exemplified by the "I/M" indicator in FIG. 8, which stands for "Invalid/Miss." The coherence controller's protocol logic 24 would then encounter the prefetch miss indicator during its normal lookup in the directory cache 18. The caching logic in the coherence controller 16 would also use the new status flag to distinguish directory cache entries generated as a result of prefetch misses from normal invalid directory cache entries. The former should be preserved in the cache for some specified time period, while the latter can be flushed.

Figure 9:
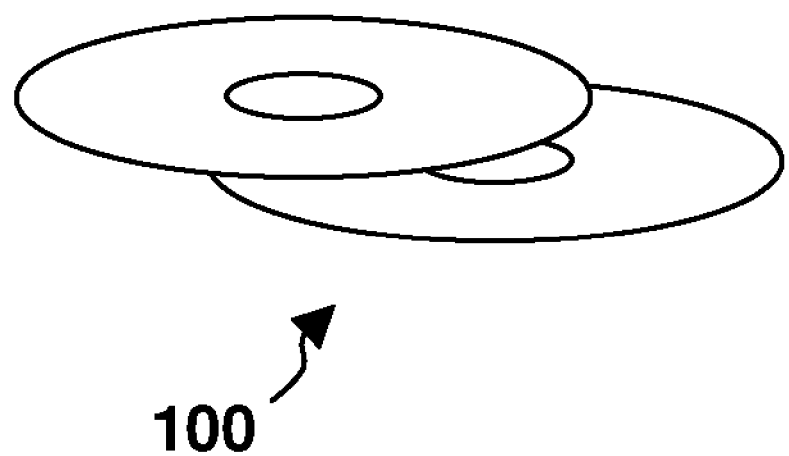
FIG. 9 is a diagrammatic illustration of storage media that can be used to store a computer program to provide an article of manufacture for implementing functions in accordance with the invention.

Accordingly, a technique has been disclosed for reducing local memory access latency resulting from cache coherence directory misses on external caches. It will be appreciated that the foregoing concepts may be variously embodied in any of a data processing system, a machine implemented method, and an article of manufacture in which programming means are recorded on one or more data storage media for use in programming a device, such as the coherence controller 16, to perform the required functions. Exemplary data storage media for storing such programming means are shown by reference numeral 100 in FIG. 9. The media 100 are shown as being portable optical storage disks of the type that are conventionally used for commercial software sales. Such media can store the programming means of the invention. The programming means could also be stored on portable magnetic media (such as floppy disks, flash memory sticks, etc.) or on magnetic media combined with drive systems (e.g. disk drives) incorporated in computer platforms.

While several embodiments of the invention have been shown and described, it should be apparent that many variations and alternative embodiments could be implemented. It is understood, therefore, that the invention is not to be in any way limited except in accordance with the spirit of the appended claims and their equivalents.

What is claimed is:

1. A directory-based cache coherence controller system for reducing latency associated with cache coherence directory misses on external caches in a shared distributed memory data processing system, comprising:
  a cache coherence directory;
  a directory cache;
  first caching logic for evaluating said cache coherence directory for possible presetting of a directory entry into said directory cache;
  second caching logic for setting a prefetch miss indicator in response to said prefetch evaluation resulting in a directory miss;
  first protocol logic for consulting said prefetch miss indicator during subsequent processing of a memory request corresponding to said directory entry; and
  second protocol logic for taking an accelerated snoop response action without reevaluating said directory based on said prefetch miss indicator being set.

2. The system of claim 1 wherein said cache coherence directory is a full mapped directory.

3. The system of claim 1 wherein said cache coherence directory is a sparse directory.

4. The system of claim 1 wherein said second caching logic includes logic for storing a tag for said directory entry.

5. The system of claim 1 further including a prefetch miss buffer and wherein said second caching logic includes logic for storing a tag for said directory entry in a prefetch miss buffer.

6. The system of claim 5 wherein said prefetch miss buffer comprises an addressable memory.

7. The system of claim 5 wherein said prefetch miss buffer comprises a storage register.

8. The system of claim 1 wherein said second caching logic includes logic for setting a prefetch miss status indicator in said directory entry and storing said entry in said directory cache.

9. The system of claim 1 wherein said first protocol logic includes logic for consulting a prefetch miss buffer in conjunction with consulting said directory cache.

10. The system of claim 1 wherein said first protocol logic includes logic for consulting said directory cache to identify a directory entry having a prefetch miss status indicator.

11. A data processing node adapted for network interconnection in a shared distributed memory data processing system, comprising:
    a plurality of processors;
    a plurality of caches respectively associated with said processors;
    a node main memory;
    a coherence controller;
    a bus interconnecting said caches, said main memory and said coherence controller;
    a cache coherence directory for locating cached copies of local memory blocks in external nodes of said data processing system;
    a directory cache for temporarily storing directory entries from said cache coherence directory;
    first caching logic in said coherence controller for evaluating said cache coherence directory for possible prefetching of a directory entry into said directory cache;
    second caching logic in said coherence controller for setting a prefetch miss indicator as a result of said prefetch evaluation resulting in a directory miss signifying that there are no external cached copies of a memory block associated with said directory entry;
    first protocol logic for consulting said prefetch miss indicator during subsequent processing of a memory block request corresponding to said directory entry; and
    second protocol logic for taking an accelerated snoop response action without reevaluating said directory based on said prefetch miss indicator being set;
    whereby latency associated with said directory miss is reduced by virtue of said accelerated response.

12. An article of manufacture for reducing latency associated with cache coherence directory misses on external caches in a shared distributed memory data processing system, comprising:
    one or more data storage media;
    means recorded on said data storage media for programming a device to operate as by:
    evaluating a cache coherence directory for possible prefetching of a directory entry into a directory cache;
    setting a prefetch miss indicator in response to said prefetch evaluation resulting in a directory miss;
    consulting said prefetch miss indicator during subsequent processing of a memory request corresponding to said directory entry; and
    taking an accelerated snoop response action without reevaluating said directory based on said prefetch miss indicator being set.

13. The article of claim 12 wherein said directory evaluating includes evaluating a full mapped directory.

14. The article of claim 12 wherein said directory evaluating includes evaluating a sparse directory.

15. The article of claim 12 wherein said setting of a prefetch miss indicator includes storing a tag for said directory entry.

16. The article of claim 12 wherein said setting of a prefetch miss indicator includes storing a tag for said directory entry in a prefetch miss buffer.

17. The article of claim 12 wherein said prefetch miss buffer comprises an addressable memory.

18. The article of claim 12 wherein said prefetch miss buffer comprises a storage register.

19. The article of claim 12 wherein said setting of a prefetch miss indicator includes setting a prefetch miss status indicator in said directory entry and storing said entry in said directory cache.

20. The article of claim 12 wherein said consulting of said prefetch miss indicator is performed by consulting a prefetch miss buffer in conjunction with consulting said directory cache.

21. The article of claim 12 wherein said consulting of said prefetch miss indicator is performed by consulting said directory cache to identify a directory entry having a prefetch miss status indicator.

* * * * *